(12) United States Patent
Yamawaki et al.

(10) Patent No.: US 12,486,643 B2
(45) Date of Patent: Dec. 2, 2025

(54) WORK MACHINE, MEASUREMENT METHOD, AND SYSTEM

(71) Applicant: KOMATSU LTD., Tokyo (JP)

(72) Inventors: Shota Yamawaki, Tokyo (JP); Yuita Takenaka, Tokyo (JP)

(73) Assignee: KOMATSU LTD., Tokyo (JP)

( * ) Notice: Subject to any disclaimer, the term of this patent is extended or adjusted under 35 U.S.C. 154(b) by 574 days.

(21) Appl. No.: 17/773,294

(22) PCT Filed: Dec. 2, 2020

(86) PCT No.: PCT/JP2020/044796
§ 371 (c)(1),
(2) Date: Apr. 29, 2022

(87) PCT Pub. No.: WO2021/124881
PCT Pub. Date: Jun. 24, 2021

(65) Prior Publication Data
US 2024/0151008 A1     May 9, 2024

(30) Foreign Application Priority Data
Dec. 16, 2019    (JP) ................. 2019-226409

(51) Int. Cl.
*E02F 9/26* (2006.01)
*E02F 3/28* (2006.01)
*G01G 19/12* (2006.01)
(52) U.S. Cl.
CPC ............... *E02F 9/26* (2013.01); *E02F 3/283* (2013.01); *G01G 19/12* (2013.01)

(58) Field of Classification Search
CPC .............. E02F 3/283; E02F 9/26; G01G 19/12
See application file for complete search history.

(56) References Cited

U.S. PATENT DOCUMENTS

| | | | |
|---|---|---|---|
| 2008/0169131 A1 | 7/2008 | Takeda et al. | |
| 2016/0167647 A1* | 6/2016 | Yamada | B60W 10/10 |
| | | | 701/50 |
| 2017/0191245 A1 | 7/2017 | Shatters et al. | |
| 2018/0051445 A1 | 2/2018 | Hori et al. | |
| 2020/0131739 A1 | 4/2020 | Ueda et al. | |
| 2020/0173144 A1* | 6/2020 | Ito | F02D 29/00 |
| 2020/0283992 A1 | 9/2020 | Nakamura et al. | |
| 2022/0090359 A1* | 3/2022 | Takenaka | E02F 9/2253 |
| 2023/0279634 A1* | 9/2023 | Yamamoto | B66C 1/68 |
| | | | 414/685 |

(Continued)

FOREIGN PATENT DOCUMENTS

| | | |
|---|---|---|
| CN | 1096266 A | 12/1994 |
| CN | 1749710 A | 3/2006 |

(Continued)

*Primary Examiner* — Saul Rodriguez
*Assistant Examiner* — Brendan P Tighe
(74) *Attorney, Agent, or Firm* — Faegre Drinker Biddle & Reath LLP

(57) ABSTRACT

A running wheel is attached to a machine main body. A boom is attached to the machine main body. A bucket is attached to the boom. A boom cylinder is attached to the machine main body and drives the boom. A controller calculates a mass of a load within the bucket based on boom cylinder force of the boom cylinder and a ground acceleration of a wheel loader.

9 Claims, 7 Drawing Sheets

(56) References Cited

U.S. PATENT DOCUMENTS

| | | | |
|---|---|---|---|
| 2024/0301660 A1* | 9/2024 | Constancon | E02F 9/264 |
| 2024/0302201 A1* | 9/2024 | Constancon | G01G 19/12 |

FOREIGN PATENT DOCUMENTS

| | | | |
|---|---|---|---|
| CN | 102889917 A | | 1/2013 |
| CN | 103046606 A | * | 4/2013 |
| CN | 105386482 A | | 3/2016 |
| CN | 110414077 A | | 11/2019 |
| JP | 2011-508187 A | | 3/2011 |
| JP | 2017-008633 A | | 1/2017 |
| JP | 2019-66310 A | | 4/2019 |
| JP | 2019-190074 A | | 10/2019 |
| WO | WO-2006/098218 A1 | | 9/2006 |
| WO | WO-2009/073127 A2 | | 6/2009 |
| WO | WO-2019/177162 A1 | | 9/2019 |

* cited by examiner

WORK MACHINE, MEASUREMENT METHOD, AND SYSTEM

TECHNICAL FIELD

The present disclosure relates to a work machine, a measurement method, and a system.

BACKGROUND ART

For example, Japanese Patent Laying-Open No. 2017-8633 (see PTL 1) discloses a method of estimating a loaded weight within a bucket in a work machine such as a wheel loader. In PTL 1, in order to estimate the loaded weight within the bucket, a list in which relation between a boom angle and a bottom pressure is defined is used. This list shows relation between a boom angle and a bottom pressure in each of a state that the bucket is unloaded, a state that a rated weight is loaded, and a state that a load at a prescribed ratio of the rated weight is loaded.

CITATION LIST

Patent Literature

PTL 1: Japanese Patent Laying-Open No. 2017-8633

SUMMARY OF INVENTION

Technical Problem

With the method of estimating a loaded weight in PTL 1, when a load having a weight other than the weight in the state shown in the list is loaded in the bucket, the loaded weight cannot accurately be estimated.

In PTL 1, the measured load weight is affected by vibration of an entire vehicular body during travel of the work machine. Therefore, a load quantity in the bucket cannot accurately be estimated during travel of the work machine.

An object of the present disclosure is to provide a work machine, a measurement method, and a system, with which a mass of a load within a bucket can accurately be estimated during travel of a work machine.

Solution to Problem

A work machine according to the present disclosure includes a running wheel, a machine main body, a boom, a bucket, an actuator, and a controller. The running wheel is attached to the machine main body. The boom is attached to the machine main body. The bucket is attached to the boom. The actuator is attached to the machine main body and drives the boom. The controller calculates a mass of a load within the bucket based on thrust of the actuator and a ground acceleration of the work machine.

A measurement method according to the present disclosure is a measurement method of measuring a mass of a load within a bucket in a work machine. The work machine includes a running wheel, a machine main body to which the running wheel is attached, a boom attached to the machine main body, a bucket attached to the boom, and an actuator attached to the machine main body, the actuator driving the boom. The measurement method includes steps below.

Information on thrust of the actuator is obtained. A ground acceleration of the work machine is obtained. A mass of a load within the bucket is calculated based on the information on thrust of the actuator and the ground acceleration of the work machine.

A system according to the present disclosure is a system that controls a work machine, and includes a running wheel, a machine main body, a boom, a bucket, and an actuator. The running wheel is attached to the machine main body. The boom is attached to the machine main body. The bucket is attached to the boom. The actuator is attached to the machine main body and drives the boom. A mass of a load within the bucket is calculated based on thrust of the actuator and a ground acceleration of the work machine.

Advantageous Effects of Invention

According to the present disclosure, a work machine, a measurement method, and a system, with which a mass of a load within a bucket can accurately be estimated during travel of a work machine, can be realized.

DESCRIPTION OF EMBODIMENTS

Figure 1:
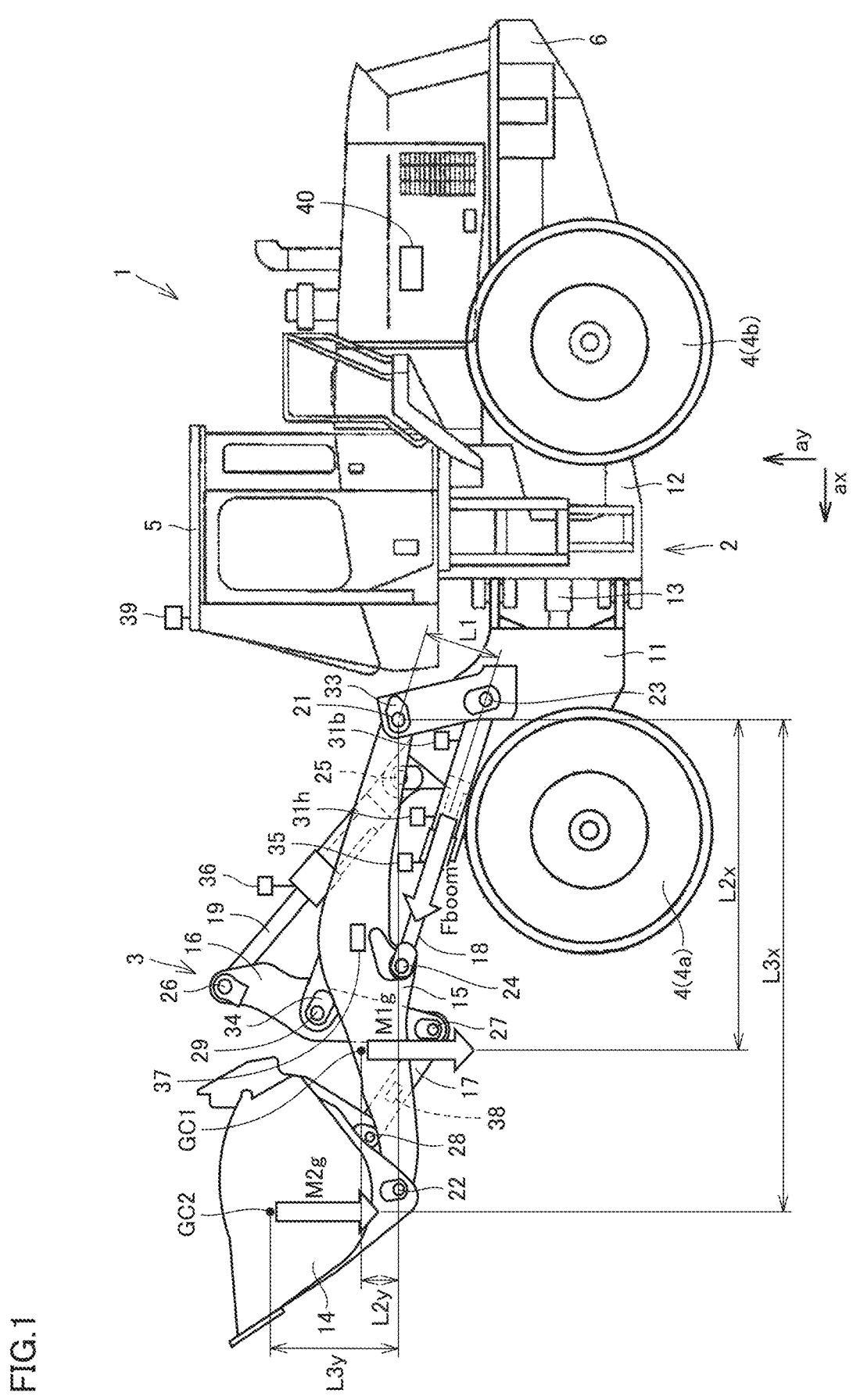
FIG. 1 is a side view of a wheel loader as an exemplary work machine according to a first embodiment.

An embodiment of the present disclosure will be described below in detail with reference to the drawings. In the specification and the drawings, the same or corresponding components have the same reference characters allotted and redundant description will not be repeated. For the sake of description, features may not be shown or may be simplified in the drawings. At least a part of an embodiment and a modification may arbitrarily be combined.

First Embodiment

<Construction of Work Machine>

A construction of a wheel loader will be described with reference to FIG. 1 as an exemplary work machine according to a first embodiment. The work machine in the present embodiment is not limited to the wheel loader. The work machine in the present embodiment should only be a work machine with wheels that carries out excavation while it travels, and a backhoe loader or a skid-steer loader may be applicable.

FIG. 1 is a side view of a wheel loader as an exemplary work machine according to the first embodiment. As shown in FIG. 1, a wheel loader 1 includes a vehicular body frame 2, a work implement 3, a traveling unit 4, and a cab 5.

A machine main body of wheel loader 1 is composed of vehicular body frame 2 and cab 5. In cab 5, a seat where an operator sits and an operation apparatus are arranged. Work implement 3 and traveling unit 4 are attached to the machine main body of wheel loader 1. Work implement 3 is arranged in front of the machine main body and a counterweight 6 is provided at a rearmost end of the machine main body.

Vehicular body frame 2 includes a front frame 11 and a rear frame 12. A steering cylinder 13 is attached to front frame 11 and rear frame 12. Steering cylinder 13 is a hydraulic cylinder. Steering cylinder 13 extends and contracts by hydraulic oil from a steering pump (not shown). As steering cylinder 13 extends and contracts, front frame 11 and rear frame 12 can swing with respect to each other in a lateral direction. A direction of travel of wheel loader 1 can thus laterally be changed.

Traveling unit 4 includes running wheels 4a and 4b. Each of running wheels 4a and 4b is a wheel and includes a tire made of rubber. Running wheel (front wheel) 4a is rotatably attached to front frame 11. Running wheel (rear wheel) 4b is rotatably attached to rear frame 12. Wheel loader 1 can be self-propelled as running wheels 4a and 4b are rotationally driven.

Work implement 3 serves to do such works as excavation. Work implement 3 is attached to front frame 11. Work implement 3 includes a bucket 14, a boom 15, a bell crank 16, a tilt rod 17, a boom cylinder 18 (an actuator), and a bucket cylinder 19.

Boom 15 has a base end rotatably attached to front frame 11 with a boom pin 21 being interposed. Boom 15 is thus rotatably attached to the machine main body. Bucket 14 is rotatably attached to a tip end of boom 15 with a bucket pin 22 being interposed.

Boom cylinder 18 drives boom 15. Boom cylinder 18 has one end rotatably attached to front frame 11 with a pin 23 being interposed. Boom cylinder 18 is thus rotatably attached to the machine main body. Boom cylinder 18 has the other end rotatably attached to boom 15 with a pin 24 being interposed.

Boom cylinder 18 is, for example, a hydraulic cylinder. Boom cylinder 18 extends and contracts by hydraulic oil from a work implement pump (not shown). Boom 15 is thus driven and bucket 14 attached to the tip end of boom 15 is moved upward and downward.

Bell crank 16 is rotatably supported on boom 15 by a support pin 29. Bell crank 16 has a first end located on one side of support pin 29 and a second end located on the other side of support pin 29. Bell crank 16 has the first end connected to bucket 14 with tilt rod 17 being interposed. Bell crank 16 has the second end connected to front frame 11 of the machine main body with bucket cylinder 19 being interposed.

Tilt rod 17 has one end rotatably attached to the first end of bell crank 16 with a pin 27 being interposed. Tilt rod 17 has the other end rotatably attached to bucket 14 with a pin 28 being interposed. Bucket 14 is rotatable with respect to boom 15.

Bucket cylinder 19 has one end rotatably attached to front frame 11 of the machine main body with a pin 25 being interposed. Bucket cylinder 19 has the other end rotatably attached to the second end of bell crank 16 with a pin 26 being interposed.

Bucket cylinder 19 is, for example, a hydraulic cylinder. Bucket cylinder 19 extends and contracts by hydraulic oil from a work implement pump (not shown). Bucket 14 is thus driven and pivots upward and downward with respect to boom 15.

Wheel loader 1 further includes a sensor that senses information on thrust $F_{boom}$ (boom cylinder force) of boom cylinder 18.

The sensor that senses information on thrust $F_{boom}$ of boom cylinder 18 is, for example, pressure sensors 31b and 31h. Each of pressure sensors 31b and 31h senses a cylinder pressure of boom cylinder 18. Pressure sensor 31b senses a bottom pressure of boom cylinder 18. Pressure sensor 31h senses a head pressure of boom cylinder 18.

The head pressure means a pressure on a cylinder rod side with respect to a piston of a hydraulic cylinder and a bottom pressure means a pressure on a tube side with respect to the piston.

Wheel loader 1 further includes a sensor that senses information on an attitude of work implement 3. The sensor that senses information on the attitude of work implement 3 includes, for example, a sensor that senses information on a boom angle and a sensor that senses information on a bucket angle.

The information on the attitude of work implement 3 refers to a dimension L1. Dimension L1 is a dimension between boom pin 21 and pin 23, in a direction orthogonal to a direction of extension of boom cylinder 18.

The boom angle refers to an angle of boom 15 with respect to front frame 11 of the machine main body The bucket angle refers to an angle of bucket 14 with respect to boom 15.

The sensor that senses information on the boom angle is, for example, a potentiometer 33. Potentiometer 33 is attached as being concentric with boom pin 21. Instead of potentiometer 33, a stroke sensor 35 of boom cylinder 18 may be employed as the sensor that senses information on the boom angle.

An inertial measurement unit (IMU) 37 or an image pick-up device (for example, a camera) 39 may be employed as the sensor that senses information on the boom angle. IMU 37 is attached, for example, to boom 15. Image pick-up device 39 is attached to the machine main body (for example, cab 5).

The sensor that senses information on the bucket angle is, for example, a potentiometer 34. Potentiometer 34 is attached as being concentric with support pin 29. Instead of potentiometer 34, a stroke sensor 36 of bucket cylinder 19 may be employed as the sensor that senses information on the bucket angle.

An IMU 38 or image pick-up device 39 may be employed as the sensor that senses information on the bucket angle. IMU 38 is attached, for example, to tilt rod 17.

Potentiometers 33 and 34, stroke sensors 35 and 36, IMUS 37 and 38, and image pick-up device 39 may be used as a sensor that senses information on a position of a center of gravity GC1 of work implement 3. Information on the position of center of gravity GC1 of work implement 3 is a dimension L2x and a dimension L2y.

Dimension L2x is a dimension between center of gravity GC1 and boom pin 21, along a forward/rearward direction of wheel loader 1. Dimension L2y is a dimension between center of gravity GC1 and boom pin 21, along an upward/downward direction of wheel loader 1.

The forward/rearward direction of wheel loader 1 herein refers to a direction in which wheel loader 1 travels straight. In the forward/rearward direction of wheel loader 1, a side on which work implement 3 is arranged with respect to vehicular body frame 2 is defined as a forward direction, and a side opposite to the forward direction is defined as a rearward direction. The upward/downward direction of wheel loader 1 is a direction orthogonal to a ground surface on which wheel loader 1 is placed. With wheel loader 1 being defined as a reference, a side on which the ground surface is present is a lower side and a side on which the sky is present is an upper side.

Dimension L2$x$ is a dimension along a horizontal direction between center of gravity GC1 and boom pin 21 while wheel loader 1 is placed on the horizontal ground surface. Dimension L2$y$ is a dimension along a vertical direction between center of gravity GC1 and boom pin 21 while wheel loader 1 is placed on the horizontal ground surface.

Potentiometers 33 and 34, stroke sensors 35 and 36, IMUS 37 and 38, and image pick-up device 39 may be used as a sensor that senses information on a position of a center of gravity GC2 of a load within bucket 14. Information on the position of center of gravity GC2 of the load within bucket 14 is a dimension L3$x$ and a dimension L3$y$.

Dimension L3$x$ is a dimension between center of gravity GC2 and boom pin 21, along the forward/rearward direction of wheel loader 1. Dimension L3$y$ is a dimension between center of gravity GC2 and boom pin 21, along the upward/downward direction of wheel loader 1.

Dimension L3$x$ is a dimension along the horizontal direction between center of gravity GC2 and boom pin 21 while wheel loader 1 is placed on the horizontal ground surface. Dimension L3$y$ is a dimension along the vertical direction between center of gravity GC2 and boom pin 21 while wheel loader 1 is placed on the horizontal ground surface.

Wheel loader 1 further includes an acceleration sensor 40 that senses a ground acceleration of wheel loader 1 (work machine). For example, the IMU may be employed as acceleration sensor 40. Acceleration sensor 40 is attached to any of work implement 3 (boom 15, bell crank 16, and bucket 14) and the machine main body. When acceleration sensor 40 is attached to the machine main body, it is attached to any of front frame 11 and rear frame 12.

The ground acceleration refers to an acceleration of wheel loader 1 with respect to the ground surface. The ground acceleration includes an acceleration ax in the forward/rearward direction and an acceleration ay in the upward/downward direction with respect to the ground surface. Acceleration sensor 40 can measure also a rotational angular velocity co in a pitching direction of wheel loader 1. Acceleration ax in the forward/rearward direction refers to an acceleration in the direction in which wheel loader 1 travels straight. Acceleration ax in the forward/rearward direction refers to an acceleration in the horizontal direction while wheel loader 1 is placed on the horizontal ground surface. Acceleration ay in the upward/downward direction refers to an acceleration in the direction orthogonal to the ground surface. Acceleration ay in the upward/downward direction refers to an acceleration in the vertical direction while wheel loader 1 is placed on the horizontal ground surface.

A gyro sensor (an angular velocity sensor), a vehicle speed sensor, a global positioning system (GPS), or image pick-up device 39 may be employed as the acceleration sensor in wheel loader 1 that senses the ground acceleration of wheel loader 1.

<Functional Block of Controller>

A functional block of controller 50 that measures a mass of a load within bucket 14 of wheel loader 1 shown in FIG. 1 will now be described with reference to FIG. 2.

Figure 2:
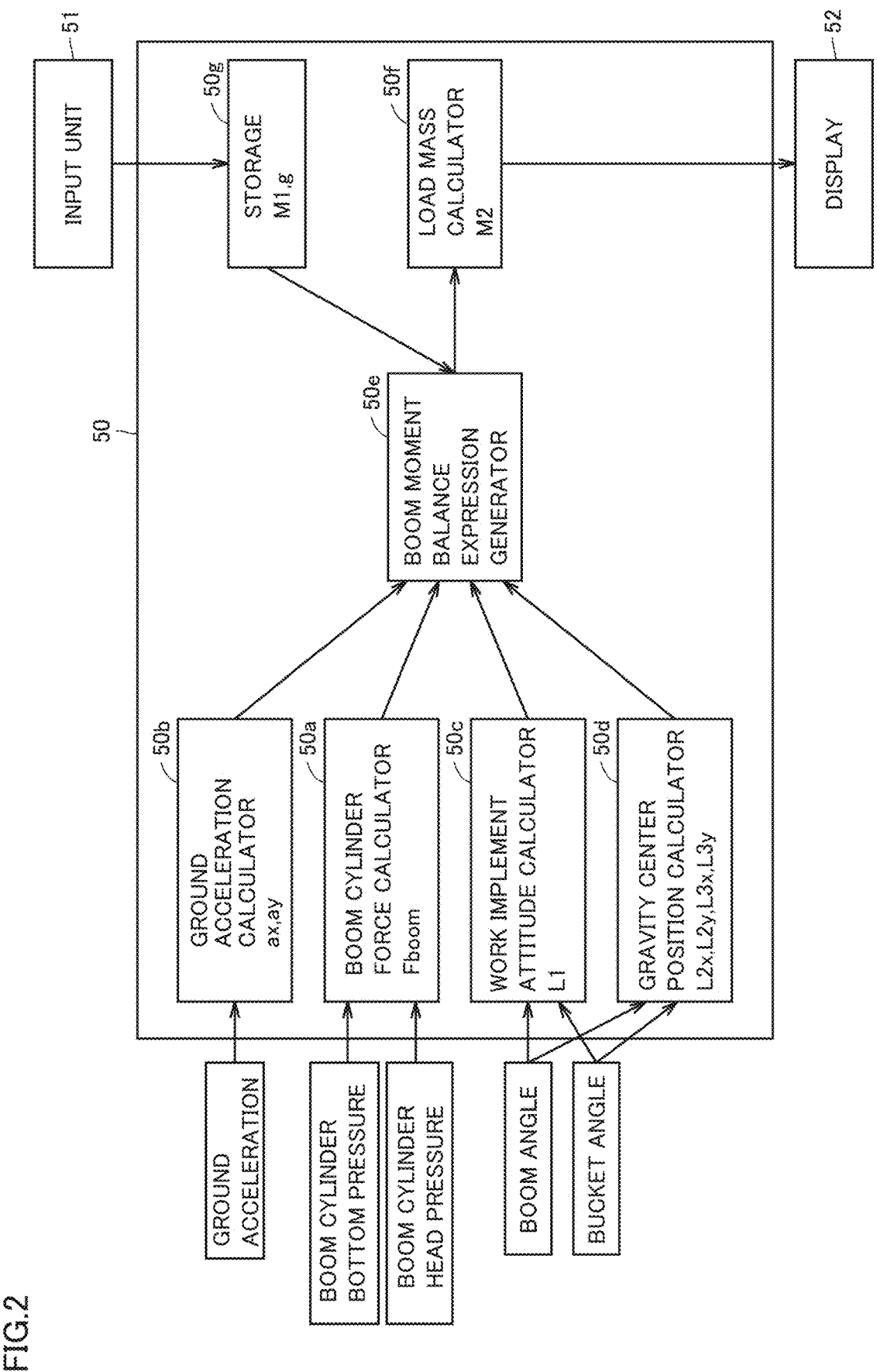
FIG. 2 is a diagram showing a functional block of a controller that measures a mass of a load within a bucket in the work machine according to the first embodiment.

FIG. 2 is a diagram showing a functional block of the controller that measures a mass of a load within the bucket in the work machine shown in FIG. 1. As shown in FIG. 2, controller 50 includes a boom cylinder force calculator 50$a$, a ground acceleration calculator 50$b$, a work implement attitude calculator 50$c$, a gravity center position calculator 50$d$, a boom moment balance expression generator 50$e$, a load mass calculator 50$f$, and a storage 50$g$.

Boom cylinder force calculator 50$a$ obtains a bottom pressure of boom cylinder 18 from pressure sensor 31$b$. Boom cylinder force calculator 50$a$ obtains a head pressure of boom cylinder 18 from pressure sensor 31$h$.

Boom cylinder force calculator 50$a$ calculates boom cylinder force $F_{boom}$ based on cylinder pressures sensed by pressure sensors 31$b$ and 31$h$. Specifically, boom cylinder force calculator 50$a$ calculates boom cylinder force $F_{boom}$ based on a bottom pressure of boom cylinder 18 obtained from pressure sensor 31$b$ and a head pressure obtained from pressure sensor 31$h$. Boom cylinder force calculator 50$a$ may calculate boom cylinder force $F_{boom}$ only from the obtained bottom pressure of boom cylinder 18. Boom cylinder force calculator 50$a$ provides calculated boom cylinder force $F_{boom}$ to boom moment balance expression generator 50$e$.

Ground acceleration calculator 50$b$ obtains the ground acceleration of wheel loader 1 from acceleration sensor 40. Ground acceleration calculator 50$b$ calculates acceleration ax in the forward/rearward direction and acceleration ay in the upward/downward direction with respect to the ground surface of wheel loader 1 based on the ground acceleration obtained from acceleration sensor 40. Ground acceleration calculator 50$b$ provides calculated ground accelerations ax and ay to boom moment balance expression generator 50$e$.

Acceleration ax in the forward/rearward direction and acceleration ay in the upward/downward direction may be measured and provided to controller 50 by acceleration sensor 40, rather than being calculated by controller 50.

Work implement attitude calculator 50$c$ obtains information on the boom angle from potentiometer 33, stroke sensor 35, IMU 37, or image pick-up device 39. Work implement attitude calculator 50$c$ obtains information on the bucket angle from potentiometer 34, stroke sensor 36, IMU 38, or image pick-up device 39.

Work implement attitude calculator 50$c$ calculates dimension L1 based on the information on the boom angle and the information on the bucket angle. Work implement attitude calculator 50$c$ provides calculated dimension L1 to boom moment balance expression generator 50$e$.

Gravity center position calculator 50$d$ obtains information on the boom angle from potentiometer 33, stroke sensor 35, IMU 37, or image pick-up device 39. Work implement attitude calculator 50$c$ obtains information on the bucket angle from potentiometer 34, stroke sensor 36, IMU 38, or image pick-up device 39.

Gravity center position calculator 50$d$ calculates dimensions L2$x$, L2$y$, L3$x$, and L3$y$ based on the information on the boom angle and the information on the bucket angle. Gravity center position calculator 50$d$ provides calculated dimensions L2$x$, L2$y$, L3$x$, and L3$y$ to boom moment balance expression generator 50$e$.

In storage 50$g$, a mass M1 of the entire work implement 3 and an acceleration of gravity g are stored. Information such as mass M1 or acceleration of gravity g may be provided to storage 50$g$ through an input unit 51 outside controller 50. Storage 50$g$ may be arranged outside controller 50, rather than being included in controller 50.

Boom moment balance expression generator 50e obtains mass M1 of the entire work implement 3 and acceleration of gravity g from storage 50g.

Boom moment balance expression generator 50e generates a boom moment balance expression (1) based on obtained boom cylinder force $F_{boom}$, ground accelerations ax and ay, dimensions L1, L2x, L2y, L3x, and L3y, masses M1 and M2, and acceleration of gravity g. M2 in the expression (1) represents a mass of a load within bucket 14.

[Expression 1]

$$F_{boom} \times L1 = M1g \times L2x + M2g \times L3x + M1 \times L2x \times a_y + M2 \times L3x \times a_y - M1 \times L2y \times a_x - M2 \times L3y \times a_x \quad (1)$$

In the expression (1), boom cylinder force $F_{boom}$ is expressed in the unit N, ground accelerations ax and ay and acceleration of gravity g are expressed in the unit m/s², dimensions L1, L2x, L2y, L3x, and L3y are expressed in the unit m, and masses M1 and M2 are expressed in the unit kg.

Boom moment balance expression generator 50e provides the expression (1) to load mass calculator 50f.

Load mass calculator 50f solves the expression (1) with respect to mass M2 as shown in an expression (2) below. Load mass calculator 50f can thus calculate mass M2 of the load within bucket 14.

[Expression 2]

$$M2 = \frac{F_{boom} \times L1 - M1g \times L2x - M1 \times L2x \times a_y + M1 \times L2y \times a_x}{g \times L3x + L3x \times a_y - L3y \times a_x} \quad (2)$$

As shown in the expression (2), controller 50 calculates M2 based on boom cylinder force $F_{boom}$, ground accelerations ax and ay, dimensions L1, L2x, L2y, L3x, and L3y, mass M1, and acceleration of gravity g.

Load mass calculator 50f provides calculated mass M2 to a display 52 outside controller 50. Display 52 may be arranged, for example, in cab 5 (FIG. 1) or at a remote location distant from wheel loader 1. Display 52 shows on a screen, calculated mass M2 or a weight M2×g. An operator who operates wheel loader 1 in cab 5 or a monitoring person who monitors an operation of wheel loader 1 at a remote location can thus recognize a mass M2 of the load within bucket 14 or a load weight M2×g.

Each of input unit 51 and display 52 may be connected to controller 50 through a wire or wirelessly.

<Method of Measuring Load Mass M2>

Figure 3:
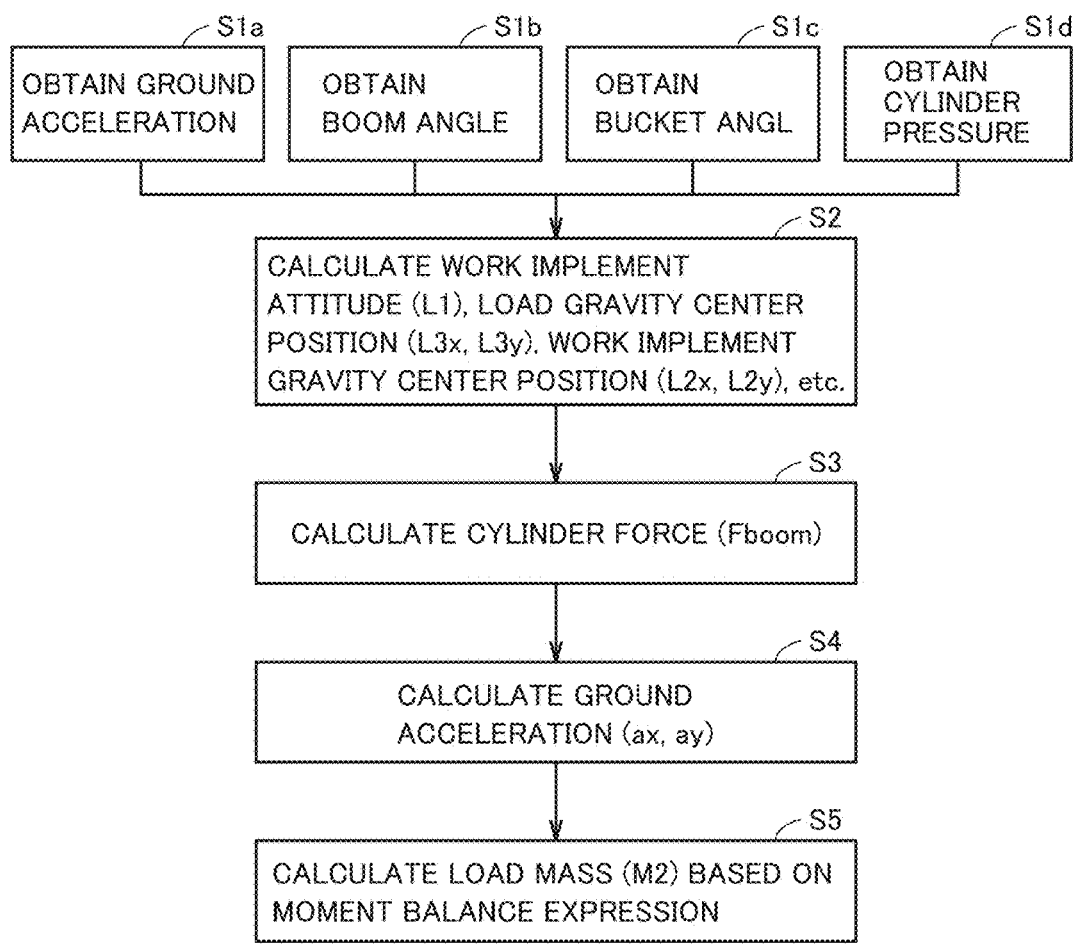
FIG. 3 is a flowchart showing a measurement method of measuring a mass of a load within the bucket in the work machine according to the first embodiment.

A method of measuring load mass M2 according to the present embodiment will now be described with reference to FIGS. 1 to 3. FIG. 3 is a flowchart showing a measurement method of measuring a mass of a load within the bucket in the work machine according to the first embodiment.

While wheel loader 1 travels, in wheel loader 1, acceleration sensor 40 shown in FIG. 1 measures the ground acceleration of wheel loader 1. Controller 50 shown in FIG. 2 obtains the measured ground acceleration (step S1a: FIG. 3).

At the time of measurement of the ground acceleration, information on the boom angle is measured. For example, potentiometer 33 shown in FIG. 1 measures information on the boom angle. Potentiometer 33 measures an angle of rotation of boom 15 with respect to front frame 11 of the machine main body.

Information on the boom angle may be a stroke length of boom cylinder 18 measured by stroke sensor 35. Alternatively, information on the boom angle may be an angle (or an angular velocity) and an acceleration along three axes of boom 15 measured by IMU 37 or an image picked up by image pick-up device 39.

Controller 50 shown in FIG. 2 obtains information on the boom angle measured as above (step S1b: FIG. 3).

In addition, at the time of measurement of the ground acceleration, information on the bucket angle is measured. For example, potentiometer 34 shown in FIG. 1 measures information on the bucket angle. Potentiometer 34 measures an angle of rotation of bell crank 16 with respect to boom 15.

Information on the bucket angle may be a stroke length of bucket cylinder 19 measured by stroke sensor 36. Alternatively, information on the bucket angle may be an angle (or an angular velocity) and an acceleration along three axes of tilt rod 17 measured by IMU 38 or an image picked up by image pick-up device 39.

Controller 50 shown in FIG. 2 obtains information on the bucket angle measured as above (step S1c: FIG. 3).

Furthermore, at the time of measurement of the ground acceleration, information on thrust of the actuator that drives boom 15 is measured. Information on thrust of the actuator that drives boom 15 is, for example, a cylinder pressure of boom cylinder 18 shown in FIG. 1. Pressure sensor 31b measures the bottom pressure of boom cylinder 18 and pressure sensor 31h measures the head pressure. Only the bottom pressure of boom cylinder 18 may be measured as information on thrust of the actuator.

Controller 50 shown in FIG. 2 obtains information (the cylinder pressure of boom cylinder 18) on thrust of the actuator that drives boom 15 measured as above (step S1d: FIG. 3). Information on thrust of the actuator obtained by controller 50 may be both of the bottom pressure and the head pressure of boom cylinder 18 or only the bottom pressure.

Thereafter, controller 50 calculates dimension L1 associated with the attitude of work implement 3, dimensions L2x and L2y representing the position of center of gravity GC1 of work implement 3, and dimensions L3x and L3y representing the position of center of gravity GC2 of the load based on obtained information on the boom angle and information on the bucket angle (step S2: FIG. 3).

Work implement attitude calculator 50c in FIG. 2 calculates dimension L1. Gravity center position calculator 50d in FIG. 2 calculates dimensions L2x, L2y, L3x, and L3y.

Controller 50 calculates boom cylinder force $F_{boom}$ (thrust of the actuator) based on the obtained cylinder pressure (step S3: FIG. 3). Boom cylinder force calculator 50a in FIG. 2 calculates boom cylinder force $F_{boom}$.

Controller 50 calculates ground acceleration ax in the forward/rearward direction and ground acceleration ay in the upward/downward direction of wheel loader 1 based on the obtained ground acceleration (step S4: FIG. 3). Ground acceleration calculator 50b in FIG. 2 calculates ground accelerations ax and ay.

Thereafter, controller 50 calculates mass M2 of the load within bucket 4 (step S5: FIG. 3). Load mass M2 is calculated by substituting ground accelerations ax and ay, dimensions L1, L2x, L2y, L3x, and L3y, and boom cylinder force $F_{boom}$ calculated above and mass M1 of the entire work implement 3 and acceleration of gravity g stored in the storage in FIG. 2 into the expression (2). Load mass calculator 50f in FIG. 2 calculates load mass M2.

Controller 50 calculates mass M2 of the load within bucket 14 during travel of wheel loader 1 as above.

The order of calculation of dimensions L1, L2x, L2y, L3x, and L3y (step S2), calculation of boom cylinder force $F_{boom}$ (step S3), and calculation of ground accelerations ax and ay (step S4) is not limited to the order shown in FIG. 3, and any order may be set. Calculation of dimensions L1, L2x, L2y, L3x, and L3y (step S2), calculation of boom cylinder force $F_{boom}$ (step S3), and calculation of ground accelerations ax and ay (step S4) may simultaneously be performed.

<Functions and Effects>

Functions and effects of the present embodiment will now be described.

While wheel loader 1 is traveling, vibration is produced in the entire wheel loader 1. In particular in work machine 1 such as a wheel loader with tires, vibration in the forward/rearward direction and the upward/downward direction is produced in the entire work machine 1 due to deformation of the tires during travel. Such vibration during travel affects measurement of load mass M2 of work machine 1.

In the present embodiment, as shown in the expression (2), mass M2 of the load within bucket 14 is calculated based not only on boom cylinder $F_{boom}$ but also on ground accelerations ax and ay of work machine 1. Therefore, mass M2 of the load within bucket 14 can be calculated in consideration of influence by vibration during travel of wheel loader 1. Thus, even during travel of work machine 1, mass M2 of the load within bucket 14 can accurately be calculated.

In the present embodiment, as shown in the expression (2), not only cylinder force $F_{boom}$ but also ground accelerations ax and ay are also included in the moment balance expression. Therefore, calibration for correcting influence by vibration during travel after the mass of the load within bucket 14 is once calculated is not required. Thus, mass M2 of the load within bucket 14 can easily be calculated during travel of work machine 1.

As set forth above, according to the present embodiment, mass M2 of the load within bucket 14 can easily and accurately be estimated during travel of work machine 1.

In the present embodiment, pressure sensors 31b and 31h measure the cylinder pressures of boom cylinder 18. Boom cylinder force $F_{boom}$ can thus be calculated based on the measured cylinder pressure of boom cylinder 18, and mass M2 of the load within bucket 14 can be calculated based on boom cylinder force $F_{boom}$.

In the present embodiment, acceleration sensor 40 senses the ground acceleration of the work machine. Mass M2 of the load within bucket 14 can thus be calculated based on ground accelerations ax and ay of the work machine.

In the present embodiment, acceleration sensor 40 senses acceleration ax in the forward/rearward direction of the work machine and acceleration ay in the upward/downward direction of the work machine as the ground acceleration of the work machine. Mass M2 of the load within bucket 14 can thus be calculated in consideration of ground acceleration ax in the forward/rearward direction and ground acceleration ay in the upward/downward direction.

In the present embodiment, mass M2 of the load within bucket 14 during travel of work machine 1 is calculated. Mass M2 of the load within bucket 14 can thus be calculated in consideration of influence by vibration during travel of wheel loader 1.

Second Embodiment

Mass M2 of the load within bucket 14 may be calculated in consideration of influence by a rotational angular velocity co in the pitching direction of work machine 1, which will be described below.

<Description of Each Point in Work Machine>

Each point in work machine 1 necessary for calculating load mass M2 according to the present embodiment will initially be described.

Figure 4:
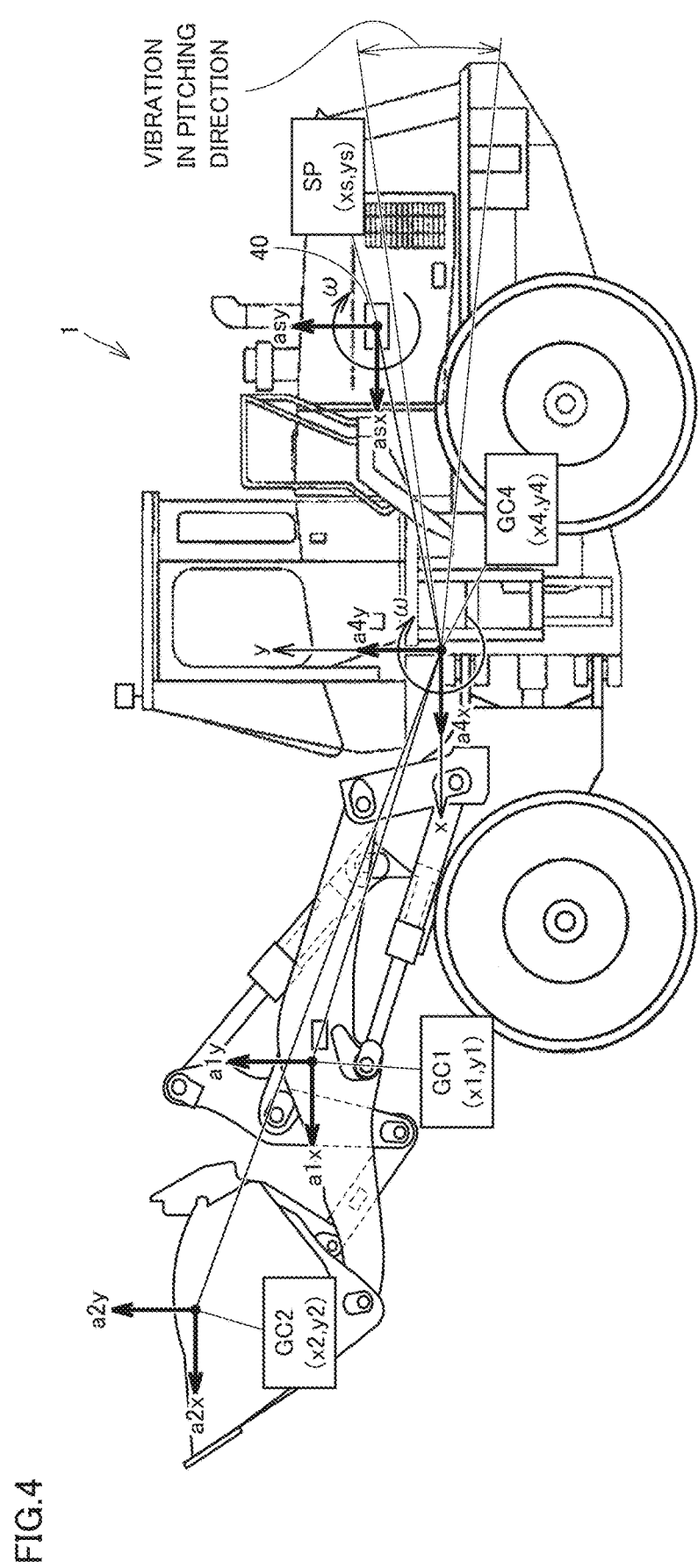
FIG. 4 is a diagram for illustrating each point in the work machine necessary for calculating a mass of a load in the work machine according to a second embodiment.

FIG. 4 is a diagram for illustrating each point in the work machine necessary for calculating a mass of a load in the work machine according to a second embodiment. As shown in FIG. 4, a point SP indicates a mount position where acceleration sensor 40 is mounted. A point GC4 indicates a vibration center in the pitching direction of the entire work machine 1. A point GC1 indicates a position of the center of gravity of work implement 3. A point GC2 indicates a position of the center of gravity of a load within bucket 14.

Mount position SP where acceleration sensor 40 is mounted is expressed with a coordinate (xs, ys) and a pitching vibration center GC4 is expressed with a coordinate (x4, y4). Center of gravity GC1 of work implement 3 is expressed with a coordinate (x1, y1) and center of gravity GC2 of the load within bucket 14 is expressed with a coordinate (x2, y2). In calculation in the present modification, the coordinate (x4, y4) of pitching vibration center GC4 is defined as the origin.

<Functional Block of Controller>

A functional block of controller 50 that measures mass M2 of a load within bucket 14 of work machine 1 shown in FIGS. 1 and 4 will now be described with reference to FIG. 5.

Figure 5:
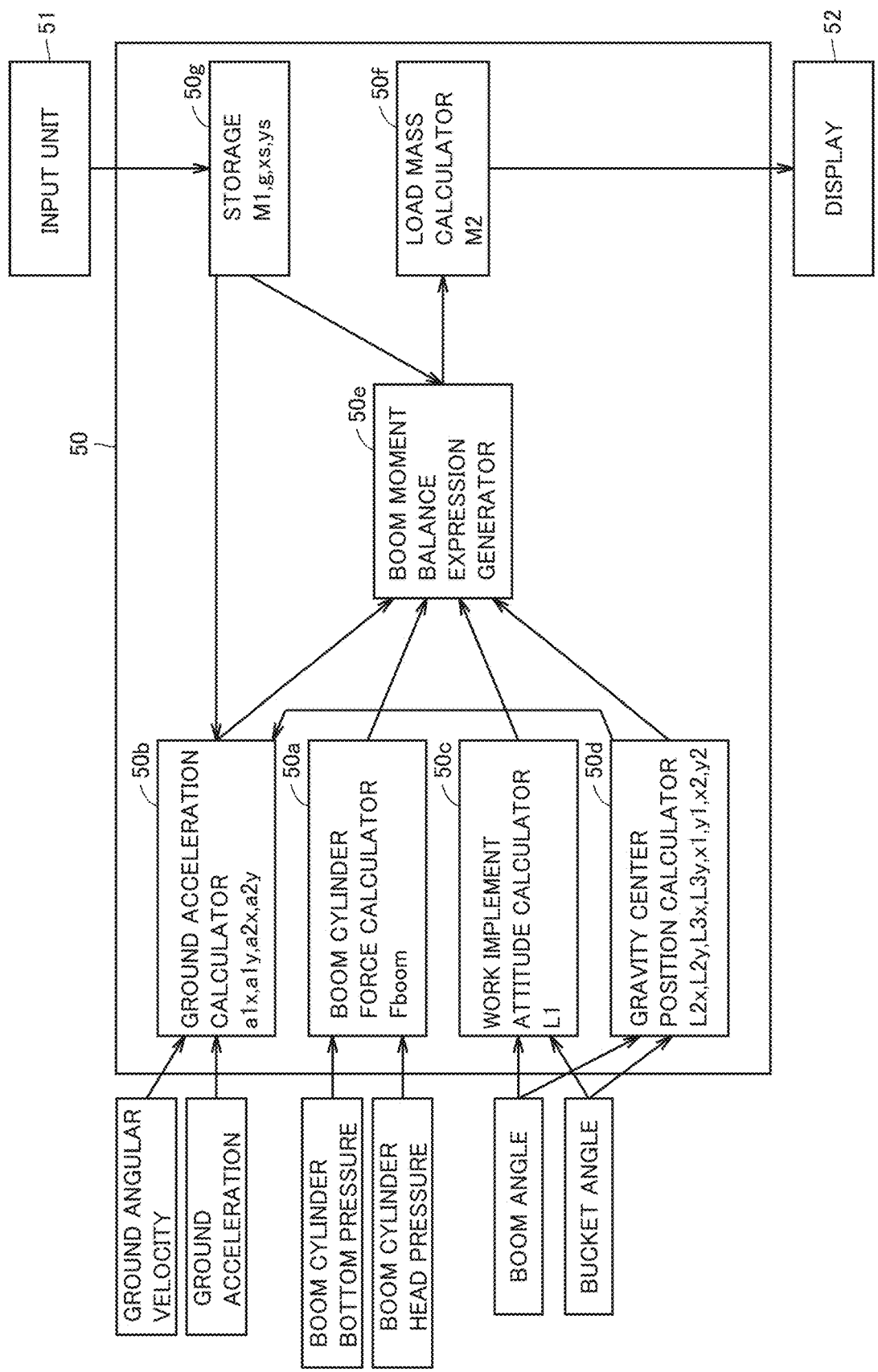
FIG. 5 is a diagram showing a functional block of the controller that measures a mass of a load within the bucket in the work machine according to the second embodiment.

FIG. 5 is a diagram showing a functional block of the controller that measures a mass of a load within the bucket in the work machine according to the second embodiment. As shown in FIG. 5, controller 50 in the present embodiment calculates ground accelerations a1x, a1y, a2x, and a2y of work machine 1 based on angular velocity co (FIG. 4) in the pitching direction of work machine 1 and calculates mass M2 of the load within bucket 14 based on calculated ground accelerations a1x, a1y, a2x, and a2y.

As in the first embodiment, controller 50 includes boom cylinder force calculator 50a, ground acceleration calculator 50b, work implement attitude calculator 50c, gravity center position calculator 50d, boom moment balance expression generator 50e, load mass calculator 50f, and storage 50g.

As in the first embodiment, boom cylinder force calculator 50a calculates boom cylinder force $F_{boom}$, work implement attitude calculator 50c calculates dimension L1, and gravity center position calculator 50d calculates dimensions L2x, L2y, L3x, and L3y. Calculated boom cylinder force $F_{boom}$, dimension L1, and dimensions L2x, L2y, L3x, and L3y are provided to boom moment balance expression generator 50e.

Gravity center position calculator 50d calculates the coordinate (x1, y1) of center of gravity GC1 of work implement 3 and the coordinate (x2, y2) of center of gravity GC2 of the load within bucket 14 based on information on the boom angle and information on the bucket angle. Gravity center position calculator 50d provides calculated coordinate (x1, y1) and coordinate (x2, y2) to ground acceleration calculator 50b.

Ground acceleration calculator 50b obtains ground accelerations asx and asy and ground angular velocity co of work machine 1 from acceleration sensor 40.

Ground accelerations asx and asy and ground angular velocity ω represent acceleration asx in the forward/rearward direction, acceleration asy in the upward/downward direction, and ground angular velocity ω at mount position SP (FIG. 4) where acceleration sensor 40 is mounted, respectively.

Ground acceleration calculator 50b obtains the coordinate (x1, y1) and the coordinate (x2, y2) from gravity center position calculator 50d. Ground acceleration calculator 50b obtains the coordinate (xs, ys) at mount position SP where acceleration sensor 40 is mounted from storage 50g.

Ground acceleration calculator 50b calculates a ground angular acceleration α by differentiating obtained ground angular velocity ω with respect to time.

Ground acceleration calculator 50b calculates accelerations a4x and a4y in accordance with an expression (3) below, based on obtained ground accelerations asx and asy, ground angular velocity co, and coordinate (xs, ys), and calculated ground angular acceleration α.

[Expression 3]

$$a4_x = as_x - (-\alpha \times ys - \omega^2 \times xs)$$

$$a4_y = as_y - (\alpha \times xs - \omega^2 \times ys) \quad (3)$$

As shown in FIG. 4, acceleration a4x in the expression (3) represents the acceleration in the forward/rearward direction at pitching vibration center GC4. Acceleration a4y represents the acceleration in the upward/downward direction at pitching vibration center GC4.

In calculation below, since the entire work machine 1 is regarded as a rigid body, angular velocity ω is applied equally to all points.

As shown in FIG. 5, ground acceleration calculator 50b calculates ground accelerations a1x, a1y, a2x, and a2y at centers of gravity GC1 and GC2 in accordance with an expression (4) below, based on accelerations a4x and a4y calculated in the expression (3), ground angular velocity co, ground angular acceleration α, the coordinate (x1, y1), and the coordinate (x2, y2).

[Expression 4]

$$a1_x = a4_x + (-\alpha \times y1 - \omega^2 \times x1)$$
$$a1_y = a4_y + (\alpha \times x1 - \omega^2 \times y1)$$
$$a2_x = a4_x + (-\alpha \times y2 - \omega^2 \times x2)$$
$$a2_y = a4_y + (\alpha \times x2 - \omega^2 \times y2)$$
(4)

As shown in FIG. 4, ground acceleration a1x of work machine 1 in the expression (4) represents the acceleration in the forward/rearward direction at center of gravity GC1 and ground acceleration a1y of work machine 1 represents acceleration a1y in the upward/downward direction at center of gravity GC1. Ground acceleration a2x of work machine 1 represents the acceleration in the forward/rearward direction at center of gravity GC2 and ground acceleration a2y of work machine 1 represents acceleration a2y in the upward/downward direction at center of gravity GC2. Accelerations a1x, a2x, and a4x in the forward/rearward direction represent the accelerations in the direction in which wheel loader 1 travels straight. Accelerations a1x, a2x, and a4x in the forward/rearward direction are accelerations in the horizontal direction while wheel loader 1 is placed on the horizontal ground surface. Accelerations a1y, a2y, and a4y in the upward/downward direction are accelerations in the direction orthogonal to the ground surface. Accelerations a1y, a2y, and a4y in the upward/downward direction are accelerations in the vertical direction while wheel loader 1 is placed on the horizontal ground surface.

As shown in FIG. 5, ground acceleration calculator 50b provides calculated ground accelerations a1x, a1y, a2x, and a2y to boom moment balance expression generator 50e.

Boom moment balance expression generator 50e obtains mass M1 of the entire work implement 3 and acceleration of gravity g from storage 50g.

Boom moment balance expression generator 50e generates a boom moment balance expression (5) from boom cylinder force $F_{boom}$, ground accelerations a1x, a1y, a2x, and a2y, dimensions L1, L2x, L2y, L3x, and L3y, masses M1 and M2, and acceleration of gravity g.

[Expression 5]

$$F_{boom} \times L1 = M1g \times L2x + M2g \times L3x + M1 \times L2x \times a1_y + \\ M2 \times L3x \times a2_y - M1 \times L2y \times a1_x - M2 \times L3y \times a2_x \quad (5)$$

In the expression (5), boom cylinder force $F_{boom}$ is expressed in the unit N, ground accelerations a1x, a1y, a2x, and a2y and acceleration of gravity g are expressed in the unit m/s², dimensions L1, L2x, L2y, L3x, and L3y are expressed in the unit m, and masses M1 and M2 are expressed in the unit kg.

Boom moment balance expression generator 50e provides the expression (5) to load mass calculator 50f.

Load mass calculator 50f solves the expression (5) with respect to mass M2 as shown in an expression (6) below. Load mass calculator 50f can thus calculate mass M2 of the load within bucket 14.

[Expression 6]

$$M2 = \frac{F_{boom} \times L1 - M1g \times L2x - M1 \times L2x \times a1_y + M1 \times L2y \times a1_x}{g \times L3x + L3x \times a2_y - L3y \times a2_x} \quad (6)$$

As shown in the expression (6), controller 50 calculates mass M2 based on boom cylinder force $F_{boom}$, ground accelerations a1x, a1y, a2x, and a2y, dimensions L1, L2x, L2y, L3x, and L3y, mass M1, and acceleration of gravity g.

Since the functional block according to the present embodiment other than the above is substantially the same in configuration as the functional block according to the first embodiment shown in FIG. 2, the same element has the same reference character allotted and description thereof will not be repeated.

<Method of Measuring Load Mass M2>

Figure 6:
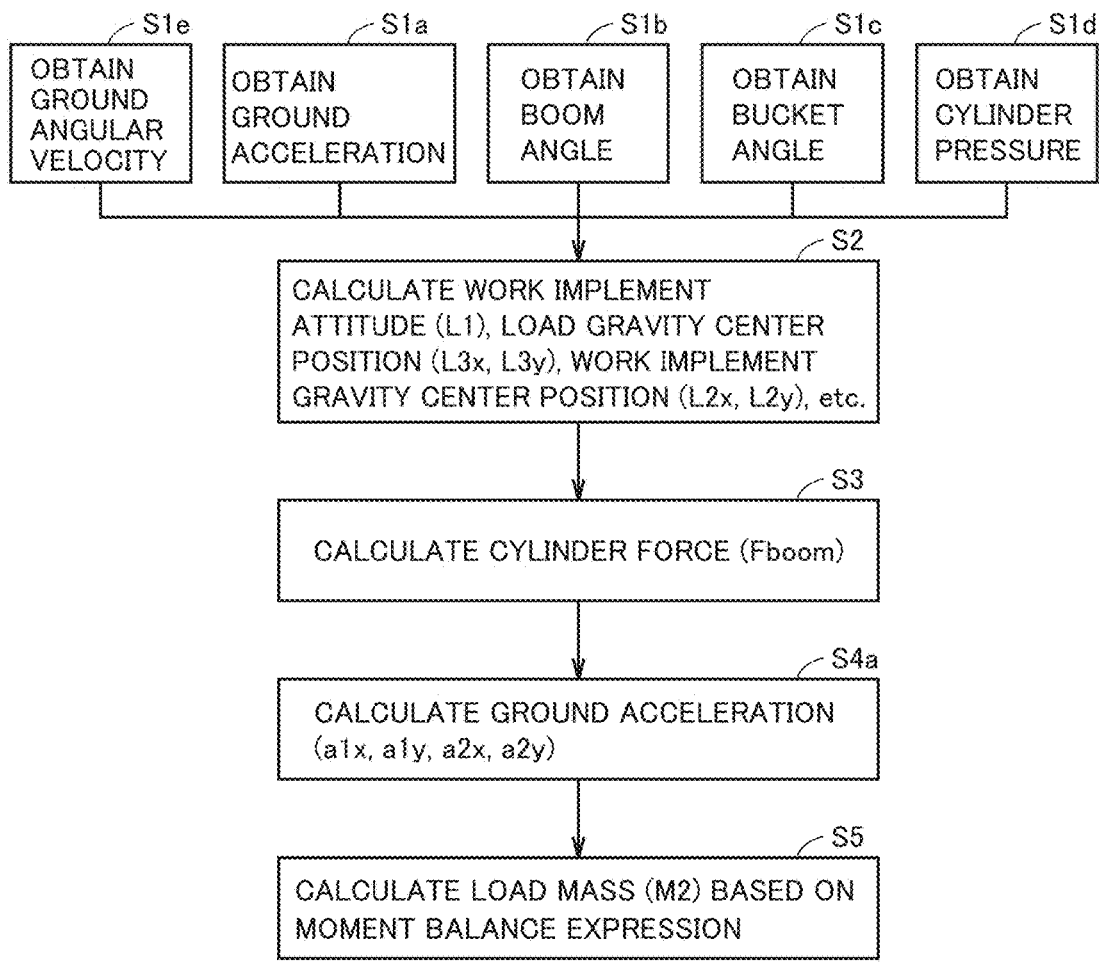
FIG. 6 is a flowchart showing a measurement method of measuring a mass of a load based on an angular velocity resulting from pitch vibration of the work machine according to the second embodiment.

A method of measuring load mass M2 according to the present embodiment will now be described with reference to FIGS. 4 to 6. FIG. 6 is a flowchart showing a measurement method of measuring a mass of a load within the bucket in the work machine according to the second embodiment.

As shown in FIG. 4, during travel or the like of work machine 1, vibration in the pitching direction is produced in work machine 1. Acceleration sensor 40 measures ground angular velocity ω resulting from vibration. Controller 50 shown in FIG. 5 obtains measured ground angular velocity ω (step S1e: FIG. 6). Specifically, ground acceleration calculator 50b of controller 50 obtains ground angular velocity co.

As in the first embodiment, controller 50 shown in FIG. 5 obtains the ground acceleration, information on the boom angle, information on the bucket angle, and information (for example, the cylinder pressure) on thrust of the actuator that drives boom 15 (steps S1a to S1d: FIG. 6).

Thereafter, controller 50 calculates dimension L1 associated with the attitude of work implement 3, dimensions L2x and L2y representing the position of center of gravity GC1 of work implement 3, dimensions L3x and L3y representing the position of center of gravity GC2 of the load, the coordinate (x1, y1), and the coordinate (x2, y2) based on the obtained information on the boom angle and information on the bucket angle (step S2: FIG. 6).

Work implement attitude calculator 50c in FIG. 5 calculates dimension L1. Gravity center position calculator 50d in FIG. 5 calculates dimensions L2x, L2y, L3x, and L3y, the coordinate (x1, y1), and the coordinate (x2, y2).

Controller 50 calculates boom cylinder force $F_{boom}$ (thrust of the actuator) based on the obtained cylinder pressure (step S3: FIG. 6). Boom cylinder force calculator 50a in FIG. 5 calculates boom cylinder force $F_{boom}$.

Controller 50 calculates ground angular acceleration α by differentiating obtained ground angular velocity ω with respect to time. Controller 50 calculates acceleration a4x in the forward/rearward direction and acceleration a4y in the upward/downward direction at pitching vibration center GC4 based on obtained ground accelerations asx and asy, ground angular velocity co, and coordinate (xs, ys) and calculated ground angular acceleration α. Accelerations a4x and a4y are calculated based on the expression (3).

Controller 50 calculates ground accelerations a1x, a1y, a2x, and a2y at centers of gravity GC1 and GC2 based on accelerations a4x and a4y, ground angular velocity co, ground angular acceleration α, the coordinate (x1, y1), and the coordinate (x2, y2) (step S4a: FIG. 6). Ground acceleration calculator 50b in FIG. 5 calculates ground accelerations a1x, a1y, a2x, and a2y. Ground accelerations a1x, a1y, a2x, and a2y are calculated based on the expression (4).

Thereafter, controller 50 calculates mass M2 of the load within bucket 4 (step S5: FIG. 6). Load mass M2 is calculated by substituting ground accelerations a1x, a1y, a2x, and a2y, dimensions L1, L2x, L2y, L3x, and L3y, and boom cylinder force $F_{boom}$ calculated above, and mass M1 of the entire work implement 3 and acceleration of gravity g stored in storage 50g in FIG. 5 into the expression (6). Load mass calculator 50f in FIG. 5 calculates load mass M2.

As set forth above, controller 50 calculates mass M2 of the load within bucket 14 during travel of wheel loader 1.

<Functions and Effects>

Functions and effects of the present embodiment will now be described.

During travel of work machine 1, vibration in the pitching direction is produced in the entire work machine 1. Such vibration in the pitching direction during travel also affects measurement of load mass M2 of work machine 1.

In the present embodiment, as shown in the expressions (3) to (6), ground accelerations a1x, a1y, a2x, and a2y of work machine 1 are calculated based on angular velocity ω in the pitching direction of work machine 1, and mass M2 of the load within bucket 14 is calculated based on calculated ground accelerations a1x, a1y, a2x, and a2y. Therefore, mass M2 of the load within bucket 14 can be calculated in consideration of influence by vibration in the pitching direction during travel of wheel loader 1. Thus, even during travel of work machine 1, mass M2 of the load within bucket 14 can accurately be calculated.

In the present embodiment, as shown in the expression (6), not only cylinder force $F_{boom}$ but also ground accelerations a1x, a1y, a2x, and a2y are also included in the moment balance expression. Therefore, calibration for correcting influence by vibration in the pitching direction during travel after the mass of the load within bucket 14 is once calculated is not required. Thus, mass M2 of the load within bucket 14 can easily be calculated during travel of work machine 1.

As set forth above, according to the present embodiment, mass M2 of the load within bucket 14 can easily and accurately be estimated during travel of work machine 1.

(Modification)

Though an example in which the coordinate (x4, y4) of pitching vibration center GC4 has a value stored in advance is described in the second embodiment, a value found by calculation may be used as the coordinate of vibration center GC4.

Figure 7:
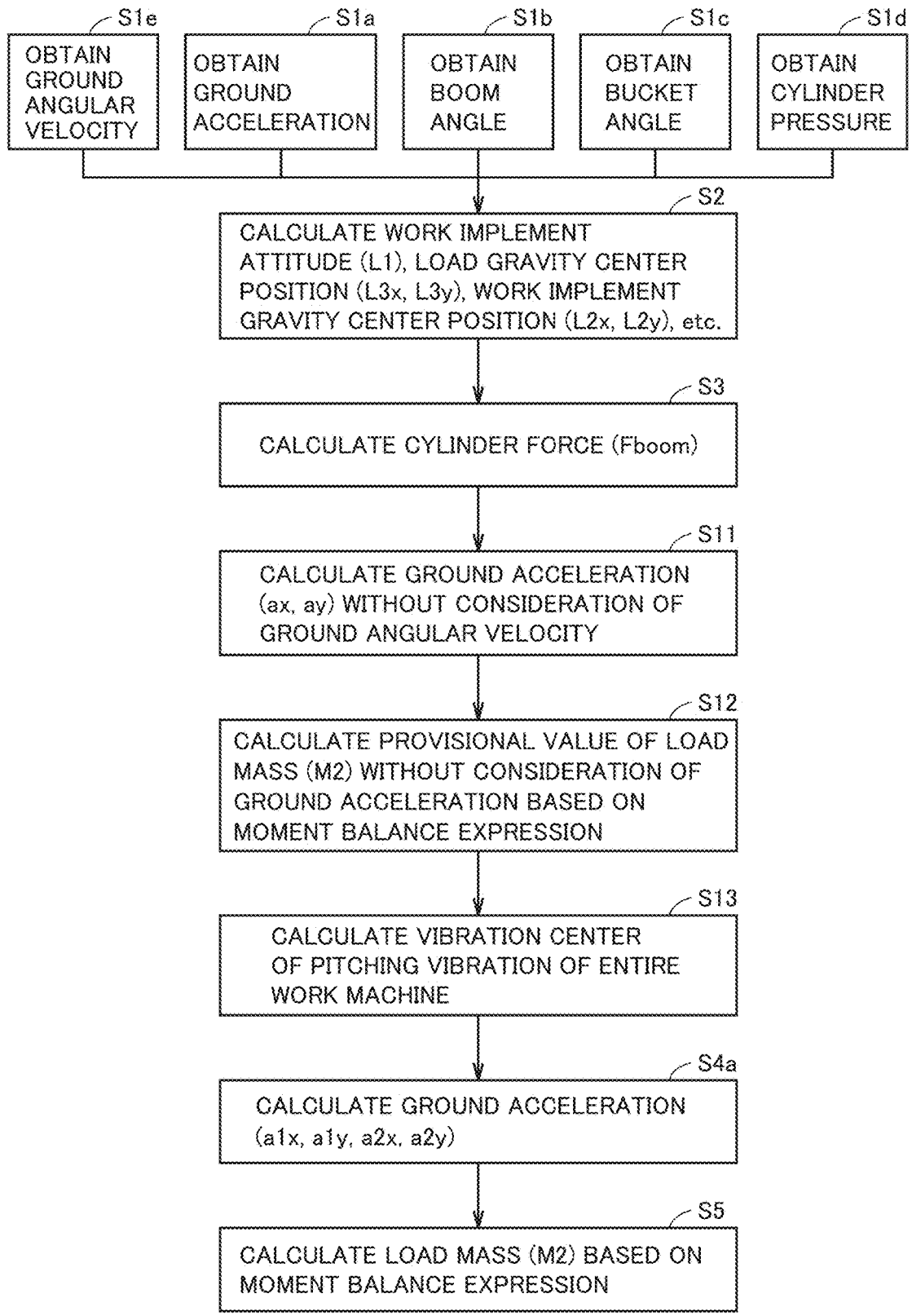
FIG. 7 is a flowchart showing a measurement method used for measurement of a mass of a load by obtaining by calculation, a coordinate of a center of rotational vibration in a pitching direction.

FIG. 7 is a flowchart showing a measurement method used for measurement of a mass of a load by obtaining by calculation, a coordinate of a center of rotational vibration in the pitching direction. As shown in FIG. 7, the flow in the present modification includes steps the same as steps S1a to S1e, S2, ad S3 in the flow in the second embodiment shown in FIG. 6.

Thereafter, in the flow in the present modification, ground accelerations ax and ay are calculated without consideration of ground angular velocity ω (step S11). Thereafter, a provisional value of load mass M2 is calculated without consideration of the ground acceleration based on the moment balance expression (step S12).

Thereafter, the coordinate (x4, y4) of vibration center GC4 in vibration in the pitching direction of the entire work machine 1 is calculated (step S13). This coordinate (x4, y4) is calculated using knowledge of vibration engineering, based on a weight of work machine 1 stored in advance, a position of the center of gravity of work machine 1, inertial moment of work machine 1, a weight of work implement 3, the measured attitude of work implement 3, the position of the center of gravity of the load within bucket 14, and the provisional value of load mass M2 calculated in step S12, with the entire work machine 1 being regarded as a rigid body and with the tire being regarded as a spring element.

Thereafter, ground accelerations a1x, a1y, a2x, and a2y are calculated (step S4a). Ground accelerations a1x, a1y, a2x, and a2y are calculated based on the coordinate (x4, y4) of vibration center GC4 calculated in step S13 and accelerations asx and asy and ground angular velocity ω measured at mount position SP.

Thereafter, as in the flow in the second embodiment, mass M2 of the load within bucket 14 is calculated based on the moment balance expression (step S5).

Controller 50 shown in FIG. 2 may be mounted on work machine 1 or arranged at a distance on the outside of work machine 1. When controller 50 is arranged at a distance on the outside of work machine 1, controller 50 may wirelessly be connected to sensors 31b, 31h, and 33 to 40. Controller 50 is implemented, for example, by a processor, and may be implemented by a central processing unit (CPU). A control system that controls work machine 1 is implemented by functions of controller 50.

Though a hydraulic cylinder is described as boom cylinder 18 (actuator) above, actuator 18 that drives boom 15 is not limited to the hydraulic cylinder. A cylinder should only generate thrust for driving boom 15, and for example, an electric cylinder may be applicable.

Though a hydraulic cylinder is described as bucket cylinder 19, actuator 19 that drives bucket 14 is not limited to the hydraulic cylinder. A cylinder should only generate thrust for driving bucket 14, and for example, an electric cylinder may be applicable.

Though pressure sensors 31b and 31h are described as the sensors that sense information on thrust of actuator 18 that drives the boom, the sensor that senses information on thrust may be a sensor that senses information on thrust of an electric cylinder or the like.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST 1 work machine (wheel loader); 2 vehicular body frame; 3 work implement; 4 traveling unit; 4a, 4b running wheel; 5 cab; 6 counterweight; 11 front frame; 12 rear frame; 13 steering cylinder; 14 bucket; 15 boom; 16 bell crank; 17 tilt rod; 18 boom cylinder; 19 bucket cylinder; 21 boom pin; 22 bucket pin; 29 support pin; 31b, 31h pressure sensor; 33, 34 potentiometer; 35, 36 stroke sensor; 39 image pick-up device; acceleration sensor; 50 controller; 50a boom cylinder force calculator; 50b ground acceleration calculator; 50c work implement attitude calculator; 50d gravity center position calculator; 50e boom moment balance expression generator; 50f load mass calculator; 50g storage; 51 input unit; 52 display; GC1, GC2 center of gravity; GC4 vibration center; SP acceleration sensor mount position; ax, ay, a1x, a1y, a2x, a2y, a4x, a4y, asx, asy ground acceleration; α ground angular acceleration; co ground angular velocity

The invention claimed is:

1. A work machine comprising:
a running wheel;
a machine main body to which the running wheel is attached;
a boom attached to the machine main body;
a bucket attached to the boom;
an actuator attached to the machine main body, the actuator driving the boom; and
a controller that calculates a mass of a load within the bucket based on thrust of the actuator and a ground acceleration of the work machine, wherein
the ground acceleration of the work machine is calculated based on an angular velocity in a pitching direction of the work machine.

2. The work machine according to claim 1, wherein
the actuator is a hydraulic cylinder,
the work machine further comprises a pressure sensor that senses a cylinder pressure of the hydraulic cylinder, and
the controller calculates the thrust of the actuator based on the cylinder pressure sensed by the pressure sensor.

3. The work machine according to claim 1, further comprising an acceleration sensor that senses the ground acceleration of the work machine.

4. The work machine according to claim 3, wherein
the acceleration sensor is attached to the machine main body.

5. The work machine according to claim 1, wherein
the controller calculates the mass of the load within the bucket based on the calculated ground acceleration of the work machine.

6. The work machine according to claim 1, wherein
the controller calculates the mass of the load within the bucket based on an acceleration in a forward/rearward direction of the work machine and an acceleration in an upward/downward direction of the work machine as the ground acceleration.

7. A measurement method of measuring a mass of a load within a bucket in a work machine, the work machine including a running wheel, a machine main body to which the running wheel is attached, a boom attached to the machine main body, the bucket attached to the boom, and an actuator attached to the machine main body, the actuator driving the boom, the measurement method comprising:
obtaining information on thrust of the actuator;
obtaining a ground acceleration of the work machine; and
calculating a mass of a load within the bucket based on the information on the thrust of the actuator and the ground acceleration of the work machine, wherein
the ground acceleration of the work machine is calculated based on an angular velocity in a pitching direction of the work machine.

8. The measurement method according to claim 7, wherein
in the calculating a mass of a load within the bucket, the mass of the load within the bucket during travel of the work machine is calculated.

9. A system that controls a work machine, the system comprising:
a running wheel;
a machine main body to which the running wheel is attached;
a boom attached to the machine main body;
a bucket attached to the boom; and
an actuator attached to the machine main body, the actuator driving the boom, wherein
a mass of a load within the bucket is calculated based on thrust of the actuator and a ground acceleration of the work machine, and
the ground acceleration of the work machine is calculated based on an angular velocity in a pitching direction of the work machine.

* * * * *